US009300191B2

(12) United States Patent
Nagayama et al.

(10) Patent No.: US 9,300,191 B2
(45) Date of Patent: Mar. 29, 2016

(54) ENCLOSED ELECTRIC MOTOR WITH VENTILATION

(75) Inventors: Takashi Nagayama, Kanagawa-ken (JP); Toshiaki Yamada, Tokyo (JP)

(73) Assignee: Toshiba Corporation, Tokyo (JP)

( * ) Notice: Subject to any disclaimer, the term of this patent is extended or adjusted under 35 U.S.C. 154(b) by 180 days.

(21) Appl. No.: 13/361,642

(22) Filed: Jan. 30, 2012

(65) Prior Publication Data
US 2012/0212086 A1 Aug. 23, 2012

(30) Foreign Application Priority Data

Feb. 18, 2011 (JP) ................................. 2011-033444

(51) Int. Cl.
| | |
|---|---|
| *H02K 9/06* | (2006.01) |
| *H02K 11/00* | (2006.01) |
| *H02K 5/20* | (2006.01) |
| *G01P 3/487* | (2006.01) |
| *H02K 5/15* | (2006.01) |

(52) U.S. Cl.
CPC ............ *H02K 11/0021* (2013.01); *G01P 3/487* (2013.01); *H02K 5/15* (2013.01); *H02K 5/20* (2013.01); *H02K 9/06* (2013.01)

(58) Field of Classification Search
CPC . H02K 9/06; H02K 11/0015; H02K 11/0021; H02K 11/0031; H02K 11/0036
USPC ................................. 310/58, 59, 62, 63, 68 B
IPC ....................................................... H02K 9/06
See application file for complete search history.

(56) References Cited

U.S. PATENT DOCUMENTS

| | | | | |
|---|---|---|---|---|
| 4,275,321 | A * | 6/1981 | Shimamoto et al. | 310/59 |
| 5,831,358 | A * | 11/1998 | Bobay | 310/58 |
| 5,864,192 | A * | 1/1999 | Nagate et al. | 310/156.05 |
| 6,774,514 | B2 * | 8/2004 | Matsuoka et al. | 310/58 |
| 8,536,744 | B2 * | 9/2013 | Nagayama et al. | 310/59 |
| 2001/0017498 | A1 | 8/2001 | Matsuoka et al. | |

FOREIGN PATENT DOCUMENTS

| | | | | |
|---|---|---|---|---|
| JP | 5950558 | U * | 4/1984 | H02K 5/10 |
| JP | 63095838 | A * | 4/1988 | |
| JP | H01-308152 | A | 12/1989 | |

(Continued)

OTHER PUBLICATIONS

Machine Translation, Matsuura et al., JP 09154254 A, Jun. 10, 1997.*
Machine Translation, Nakamura et al., JP 2009284736 A, Dec. 3, 2009.*
USPTO Translation, Okuda et al., JP 63095838 A, Apr. 26, 1988.*

(Continued)

*Primary Examiner* — Thomas Truong
(74) *Attorney, Agent, or Firm* — Baker Botts L.L.P.

(57) ABSTRACT

In one embodiment, an electric motor. A first bracket is fixed to the first side of a stator core in an axial direction, and is fixed to first bearing housing. A second bracket is fixed to the second side of the stator core, and is fixed to second bearing housing. The rotor includes a shaft rotatably supported by bearings, and an attached rotor core. Rotor core faces the inside of the stator core. A fan is attached to the shaft between the rotor core and the first housing. A flue formed between the first housing and the first bracket is configured to draw air from a port to a part of the first bracket. A rotation detection circuit includes a detected part fixed to the fan, and is within the flue. A sensor operable to detect the part is set in the flue, counter to the detected part.

20 Claims, 8 Drawing Sheets

(56) References Cited

FOREIGN PATENT DOCUMENTS

| JP | 09154254 A | * | 6/1997 |
| JP | 2004-187352 A | | 7/2004 |
| JP | 2007-267483 A | | 10/2007 |
| JP | 2009284736 A | * | 12/2009 |
| JP | 2010-220417 | | 3/2010 |
| WO | WO 2010106761 A1 | * | 9/2010 |

OTHER PUBLICATIONS

USPTO Partial Translation, Kinoshita, JP 5950558 U, Apr. 1984.*
USPTO Translation, Kinoshita, JP 59050558, Apr. 1984.*
Office Action, Written Opinion and Search Report issued in related Singapore Patent Application No. 2013062278 mailed Nov. 27, 2014, 14 pages.

* cited by examiner

ENCLOSED ELECTRIC MOTOR WITH VENTILATION

CROSS-REFERENCE TO RELATED APPLICATION

This application is based upon and claims the benefit of priority from Japanese Patent Application No. 2011-033444, filed Feb. 18, 2011, the entire contents of which are incorporated herein by reference.

FIELD

Embodiments described herein relate to a motor for driving a railroad vehicle.

BACKGROUND

Generally, in a railroad vehicle (hereinafter "vehicle"), a main motor (hereafter "electric motor") is loaded in the cart which is located under the body. The torque of this electric motor is transmitted to a wheel via a joint and a spur gearing, and is used to move the vehicle.

Extension of the maintenance cycle, i.e., the need for an electric motor with longer periods between the performance of maintenance, is increasing. In order to satisfy such needs, the development of a totally enclosed motor is desirable.

The structure of a totally enclosed motor is explained. The inner side of the circumference of a cylindrical frame is provided with a stator iron core, which has a stator coil in the totally enclosed motor. The bracket and housing, which comprise the sealing case, are attached to both ends of the frame. The bearing is respectively built in these brackets and the housing.

A rotor shaft extends through the sealing case, and both ends are supported by the bearings, enabling free rotation. A rotor iron core is attached to the central part of the rotor shaft, and it is located inside the stator iron core. A ventilation fan is attached to the rotor shaft within the sealing case. The labyrinth seal part is formed between a ventilation fan's peripheral part, and a bracket.

An inspiratory port is formed in the perimeter portion of the bearing of a bracket, the open air is led to a ventilation fan's center section from this inspiratory port, and it is discharged outside through the ventilation flue of a bracket.

For an electric motor composed in this way, the open air does not circulate inside of the apparatus, so the inside of apparatus is not soiled with dust. Therefore, the need to disassemble the apparatus so that the inside of electric motor can be cleaned is eliminated or reduced.

The electric motor includes a detection part which rotates with the rotor, and a speed sensor which detects the detection part in order to perform rotation control and vehicle brake control. These detection parts and the speed sensor are outside of the sealing case, and are covered by the cover for intercepting the open air.

Because the electric motor for a rail car is installed in the narrow attachment space of the cart, usually there are space restrictions. Therefore, when the speed sensor and detection part are attached to the outside of the sealing case (with the speed sensor and detection parts covered as described), the size of the axis of the electric motor (consisting of a stator iron core and a rotor iron core) becomes small. When the size of the axis of the electric motor becomes smaller, the output of the electric motor will decrease as a result.

SUMMARY

An electric motor is disclosed herein. The motor has a stator core. The motor has a first bracket fixed to the first side of the stator core in an axial direction. The first bracket has a first bearing housing fixed to it, and the first bearing housing holds a bearing. The motor has a second bracket fixed to the second side of the stator core in the axial direction. The second bracket has a second bearing housing fixed it, and the second bearing housing holds a bearing. The motor has a rotor that is comprised of a rotor shaft that is rotatably supported by the bearings, and a rotor core attached to the rotor shaft. The rotor core faces an inner side of the stator core. A ventilation fan is attached to the rotor shaft between the rotor core and the first bearing housing. A ventilation flue is formed between the first bearing housing and the first bracket, and the ventilation flue is configured to draw open air from an inspiratory port to a peripheral part of the first bracket. The motor also has a rotation detection circuit comprised of a detected part and a sensor. The detected part is fixed to the ventilation fan and is within the ventilation flue. The sensor is operable to detect the detected part. The sensor is set in the ventilation flue and is positioned counter to the detected part.

An electric motor according to another embodiment is disclosed herein. The motor has a stator core. The motor has a first bracket fixed to the first side of the stator core in an axial direction. The first bracket has a first bearing housing fixed to it, and the first bearing housing holds a bearing. The motor has a second bracket fixed to the second side of the stator core in the axial direction. The second bracket has a second bearing housing fixed it, and the second bearing housing holds a bearing. The motor has a rotor that is comprised of a rotor shaft that is rotatably supported by the bearings, and a rotor core attached to the rotor shaft. The rotor core faces an inner side of the stator core. A first ventilation fan is attached to the rotor shaft between the rotor core and the first bearing housing. A first ventilation flue is formed between the first bearing housing and the first bracket, and the first ventilation flue is configured to draw open air from an inspiratory port to a peripheral part of the first bracket. A second ventilation fan is attached to the rotor shaft between the rotor core and the second bearing housing. A second ventilation flue is formed between the second bearing housing and the second bracket, and the second ventilation flue is configured to draw open air from an inspiratory port to a peripheral part of the second bracket. The motor also has a rotation detection circuit comprised of a detected part and a sensor. The detected part is fixed to the first ventilation fan and is within the first ventilation flue. The sensor is operable to detect the detected part. The sensor is set in the first ventilation flue and is positioned counter to the detected part.

An electric motor according to yet another embodiment is disclosed herein. The motor has a stator core. The motor has a first bracket fixed to the first side of the stator core in an axial direction. The first bracket has a first bearing housing fixed to it, and the first bearing housing holds a bearing. The motor has a second bracket fixed to the second side of the stator core in the axial direction. The second bracket has a second bearing housing fixed it, and the second bearing housing holds a bearing. The motor has a rotor that is comprised of a rotor shaft that is rotatably supported by the bearings, and a rotor core attached to the rotor shaft. The rotor core faces an inner side of the stator core. A first ventilation fan is attached to the rotor shaft between the rotor core and the first bearing housing. A first ventilation flue is formed between the first bearing housing and the first bracket, and the first ventilation flue is configured to draw open air from an inspiratory port to a peripheral part of the first bracket. A second ventilation fan is attached to the rotor shaft between the rotor core and the second bearing housing. A second ventilation flue is formed between the second bearing housing and the second bracket, and the second ventilation flue is configured to draw open air from an inspiratory port to a peripheral part of the second bracket. The motor also has a rotation detection circuit comprised of a detected part and a sensor. The detected part is fixed to the second ventilation fan and is within the second ventilation flue. The sensor is operable to detect the detected part. The sensor is set in the second ventilation flue and is positioned counter to the detected part.

DETAILED DESCRIPTION

Various embodiments will be hereinafter explained with reference to the drawings. The same numerals shall be given to common structures in the embodiments. Redundant explanations of the same numerals is omitted. Each figure is a mimetic diagram illustrating an embodiment for helping the understanding thereof. In each figure, the shape, size, ratio, etc., may be different from those in an actual apparatus, in consideration of publicly known technology, the design variation of these can be suitably carried out according to the following explanation.

Figure 1:
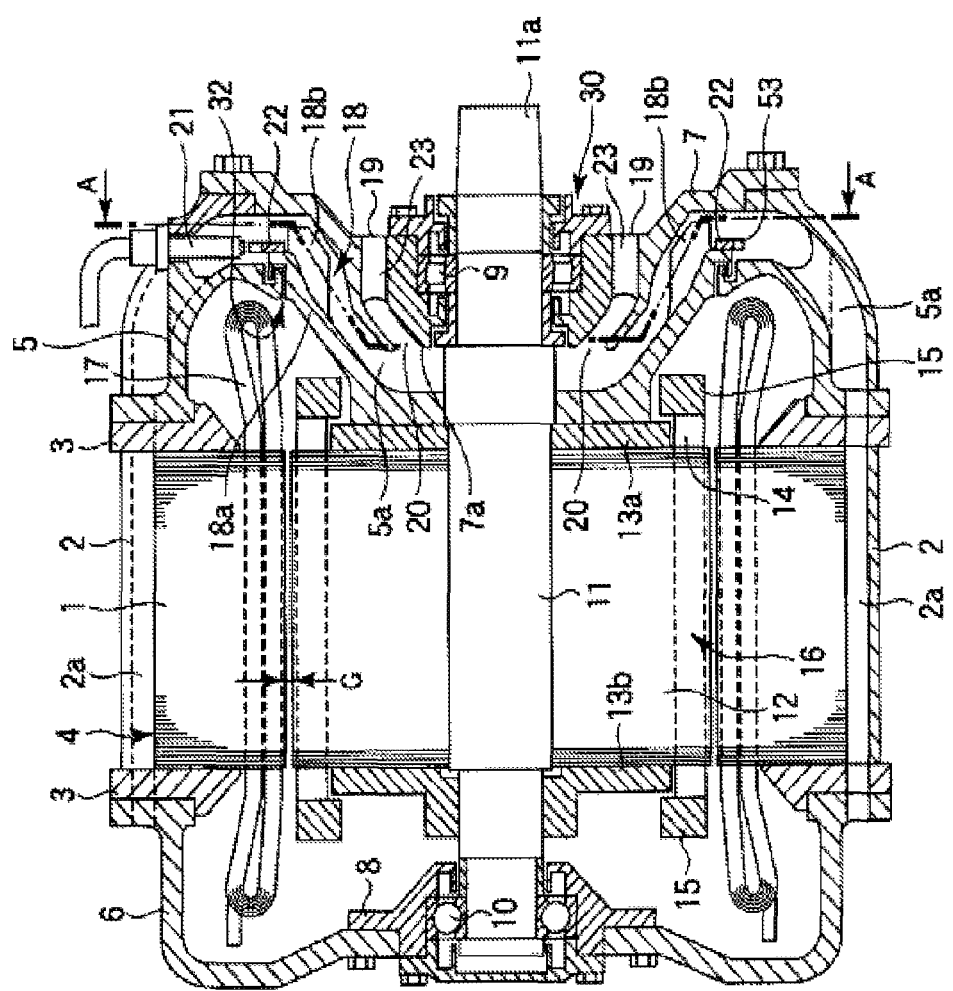
FIG. 1 is a longitudinal section showing the electric motor related to a First Embodiment.
Figure 2:
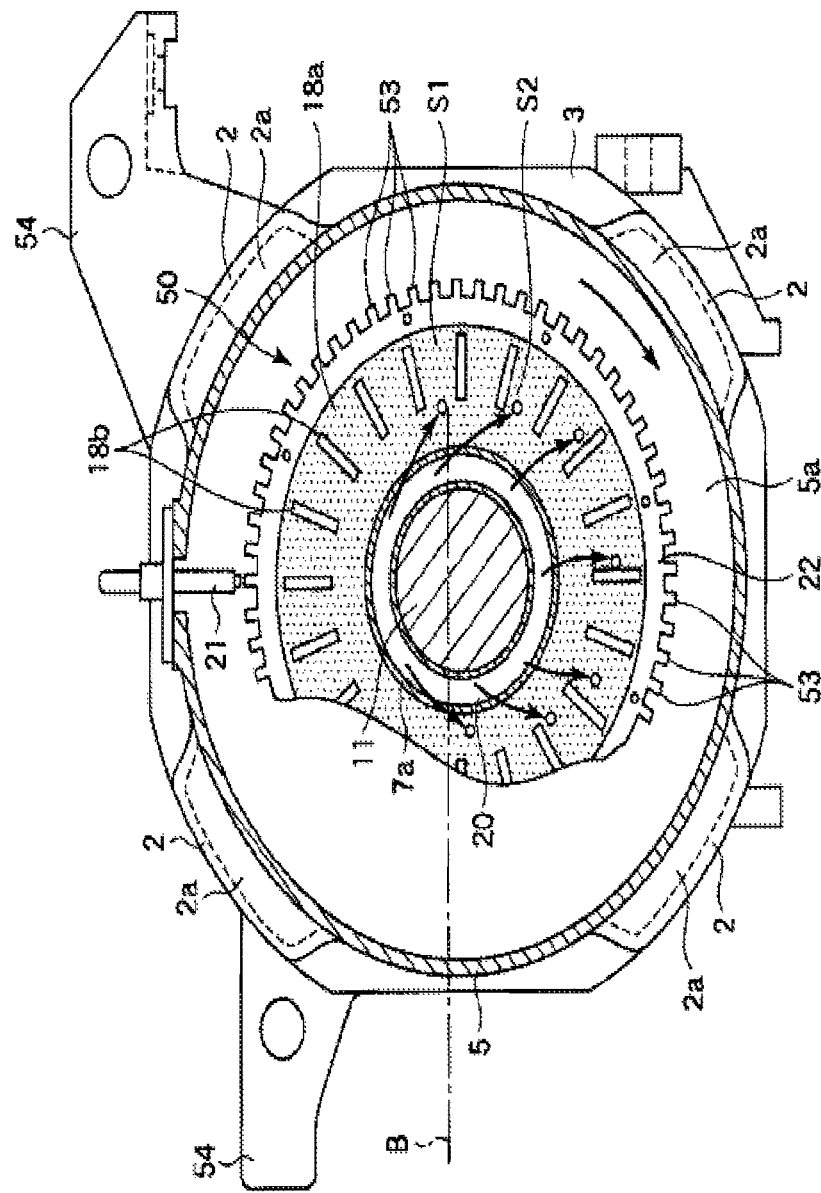
FIG. 2 is a transverse cross section of the electric motor in alignment with line A-A of FIG. 1.

FIG. 1 is a longitudinal section showing the totally enclosed motor according to the First Embodiment. FIG. 2 shows the cross section by the drive side of the electric motor in alignment with line A-A of FIG. 1.

As shown in FIG. 1, this electric motor includes cylindrical material, for example, are cylindrical stator iron core 1. A pair of annular core holders 3 and 3 are fixed to both-ends of stator iron core 1 in the axial direction. A plurality of connector plates 2 are allocated, and extend in the direction of the axis of stator iron core 1, respectively, and these connector plates 2 connect two core holders 3 and 3 with the perimeter of stator iron core 1, and are fixed to it. The plurality of connector plates 2 keep an interval in the direction of the circumference of stator iron core 1, and are located at stator iron core 1. Cooling ventilation flue 2a is formed of each connector plate 2 and the peripheral face of stator iron core 1.

The first almost cylindrical bracket 5 formed by an aluminium alloy, etc., and is attached to core holder 3 at the drive side end of stator iron core 1. Annular bearing bracket (the first bearing housing) 7 concludes at the tip side of the first bracket 5, concentrically, with the bolt. The first bearing part 30, which has built in the first bearing 9, is concluded with the bolt by the central part of bearing bracket 7.

Second bracket 6, a bowl shape formed by an aluminum alloy, etc., is attached to core holder 3, and is located at the anti-drive end side of stator iron core 1. Second bracket 6 has a second bearing comprising bearing housing 8, which has built in ball bearing 10, and is concluded with a bolt to the central part of second bracket 6.

The case (body) of this electric motor is composed by stator iron core 1, annular core holder 3 and 3, the first bracket 5, first bearing housing 7, second bracket 6, first bearing part 30, and second bearing housing 8.

Stator iron core 1 has a plurality of laminated annular metal plates, which consist of magnetic material (for example, silicon steel plate).

A plurality of slots elongated in the direction of an axis are formed in the inner periphery of stator iron core 1, and stator coil 17 is embedded into these slots. The coil end of stator coil 17 is jutted out of the both-ends side of stator iron core 1 in the direction of the axis. The stator is composed by stator iron core 1 and stator coil 17.

Cylindrical shaped rotor iron core 12 is located in the same axle, maintaining space G inside stator iron core 1. Rotor shaft 11 is attached to the central part of rotor iron core 12 in the same axle. The both ends of rotor shaft 11 are supported with roller bearing 9 and ball bearing 10, enabling free rotation. Rotor shaft 11 has extended in the same axle in a case.

Rotor shaft 11 and rotor iron core 12 compose rotor 16. Drive side edge part 11a of rotor shaft 11 extends outside the plane. The joint for connecting a drive spur gearing is attached to drive side edge part 11a of rotor shaft 11.

Rotor iron core 12 consists of several laminated magnetic materials (for example, annular metal plate consisting of a silicon steel plate). Rotor iron core 12 is supported by a pair of core holders 13a and 13b attached to rotor shaft 11 so that rotor iron core 12 may be inserted from either side of the axis. Core holder plates 13a and 13b are formed annularly, and the outer diameter is formed slightly smaller than the outer diameter of rotor iron core 12.

A plurality of slots, which extend in the direction of an axis respectively, are formed in the peripheral part of rotor iron core 12. Rotor bar 14 is embedded in each slot of rotor iron core 12. Both ends of rotor bar 14 jut out of rotor iron core 12. The overhang portion of rotor bar 14 is connected to end rings 15 and 15. A basket type rotor of an induction motor is formed with rotor bar 14 and end ring 15. By energizing the stator coil 17, rotor iron core 12 is guided and it rotates. When rotor iron core 12 rotates, rotor shaft 11 rotates.

In order to suppress the generation of heat by the rotor and to realize a more compact electric motor, the rotor may be comprised of a permanent magnet in the rotor core, instead of a basket type rotor, to form a permanent magnet form electric motor.

Ventilation fan 18 is attached to rotor shaft 11 between the first bearing part 30 at the drive end side, and rotor iron core 12 on the same axle.

Ventilation fan 18 can rotate freely with rotor shaft 11. Ventilation fan 18 is mostly formed in funnel shape. Ventilation fan 18 is composed by main plate 18a and impeller blade 18b. Main plate 18a is inclined and elongated toward the first bracket 5 from the rotor iron core 12 side. A plurality of impeller blades 18b are set in the main plate 18a on the side facing bearing bracket 7.

Main plate 18a touches rotor iron core 12 in many respects via core holder 13a. A minute gap is kept where an outer peripheral part of main plate 18a and an inner peripheral projecting part of an inside portion of the first bracket 5 are mutually engaged. This circular minute interval part is mutually formed in an abbreviated two-step structure of concaveconvex shape, and forms labyrinth structure section 32. A plurality of fins are formed in bearing bracket 7 and the external surface which counters.

As shown in FIG. 1 and FIG. 2, the plurality of impeller blades 18b are set in the peripheral part of main plate 18a. Impeller blades 18b are prolonged radiately, respectively. Impeller blades 18b are set in the main plate in regular intervals along the circumference of main plate 18a.

As shown in FIG. 1, a plurality of inspiratory ports 19 are formed in bearing bracket 7. These inspiratory ports 19 go to the outside of the first bearing part 30, and are provided along rotor shaft 11 in a concentric fashion. The central part of bearing bracket 7 has projection section 7a projected toward the inner side of the apparatus along the direction of an axis of rotor shaft 11. Annular discharge mouth 20 is formed in the projection end of projection section 7a. Discharge mouth 20 is formed in the same axle with rotor shaft 11.

Discharge mouth 20 is placed near the central part of ventilation fan's 18 main plate 18a and near the rotor shaft 11. In bearing bracket 7, guidance channel 23 has extended along the direction of an axis of rotor shaft 11 from inspiratory port 19. A bearing bracket 7 extends to discharge mouth 20 from the center section of main plate 18a. A plurality of guidance channels 23 are formed in bearing bracket 7.

The space between the external surface of main plate 18a and the inner side of bearing bracket 7 and the peripheral part of the first bracket 5 are covered, and ventilation flue 5a is formed. From the central part of main plate 18a, this ventilation flue 5a covers the perimeter of the first bracket 5, and is prolonged radiately. Ventilation flue 5a is divided by the main plate 18a of ventilation fan 18 and labyrinth structure section 32 from the inside of the body. Ventilation fan's 18 impeller blade 18b is located in ventilation flue 5a. Ventilation flue 5a is open for free passage to a plurality of cooling ventilation flues 2a formed of stator iron core 1 and connecting plate 2.

Because stator coil 17 and rotor bar 14 generate heat at the time of operation of an electric motor, performance can be maintained, as ventilation flue 5a is made to ventilate the open air for cooling positively and the temperature of an electric motor does not rise. This cooling action is as follows.

Rotation of an electric motor will rotate ventilation fan 18 and rotor shaft 11. A wind occurs into the portion of ventilation fan's 18 impeller blade 18b. The cold open air flows from air inspiratory port 19 of bearing bracket 7. The open air flows through guidance channel 23 and discharge mouth 20, and is led to flow near rotor shaft 11 and the central part of main plate 18a. A cooling wind flows through the inside of ventilation flue 5a into the perimeter side over the external surface of main plate 18a from the central part of main plate 18a. The heat generated with rotor bar 14 is transmitted to main plate 18a via main plate 18a of rotor iron core 12, core holder 13a, and a ventilation fan. The heat that is able to transmit main plate 18a radiates heat from main plate 19a and impeller blade 18b.

This composition enables it to cool rotor bar 14. Simultaneously, the wind generated by impeller blade 18b flows into cooling ventilation flues 2a of plurality from ventilation flue 5a of the first bracket 5. After this wind cools stator iron core 1 through these cooling ventilation flues 2a, it is discharged outside. The heat generated with stator coil 17 spreads to stator iron core 1. This heat radiates to the cooling air from the peripheral face of stator iron core 1.

From the surface of stator iron core 1, which is not surrounded by connecting plate 2 directly, heat is automatically radiated in the open air and generation of heat is controlled further. Thereby, it becomes possible to cool stator coil 17.

On the other hand, to prepare the electric motor for the object of rotation control or vehicle brake control, a rotation detection circuit which detects the rotation number of an electric motor is provided. The rotation detection circuit (for example, PG sensor 21, which is a magnetic sensor) rotates with rotor shaft 11, and is included with a detection part 50 detectably by the PG sensor.

As shown in FIG. 1 and FIG. 2, PG sensor 21 is attached to the peripheral part of the first bracket 5, and is projected in ventilation flue 5a from the first bracket. PG sensor 21 is prolonged in a diameter direction to rotor shaft 11, and the perception end is located in ventilation flue 5a.

Detection part 50 has magnetic body 22, for example, an annular gear plate formed with iron. This gear plate 22 is composed by many teeth 53 with which the perimeter portion is located in an uneven line and the direction of the circumference in a predetermined pitch.

Gear plate 22 is fixed to the outside of labyrinth structure section 32 on the outer periphery part of ventilation fan's 18 main plate 18a. Gear plate 22 is located in ventilation flue 5a while it is located in the same axle with rotor shaft 11. Gear plate 22 and PG sensor 21 are located along the diameter direction of rotor shaft 11. PG sensor 21 is located to gear plate 22 on the outside direction of the diameter.

The detection end of PG sensor 21 is placed in the space at a predetermined interval (for example, about 1 mm), and has countered with tooth 53.

PG sensor 21 is set about the perpendicular direction up, rather than discharge mouth 20 (here, the PG sensor 21 is the upper part from horizon B passing through the center of rotor shaft 11).

According to this embodiment, PG sensor 21 is set right above rotor shaft 11 in the perpendicular direction.

In the above-mentioned composition, rotation of the electric motor will also rotate gear plate 22 with ventilation fan 18. If tooth 53 of gear plate 22 passes through the detection end of PG sensor 21, PG sensor 21 will detect this tooth 53, and will output a pulse signal. The rotation number of the electric motor and revolving speed are detectable by detecting the pulse signal outputted from PG sensor 21.

Final fixation of the attachment arm 54 of stator iron core 1 of the electric motor composed as mentioned above is carried out with the bogie frame and bolt of a rail car. An electric motor is installed in vehicles by combining with the spur gearing for a drive via the joint, which is not illustrated, at drive end part 11a of rotor shaft 11. The torque of an electric motor is transmitted to a wheel from the spur gearing for a drive, and it is made to move vehicles.

According to the totally enclosed motor composed as mentioned above, stator coil 17, rotor bar 14, and the inside of the apparatus containing these are surrounded with stator first bracket 5, ventilation fan's 18 main plate 18a, bearing housing 8, and second bracket 6. The inside of the apparatus is blocked from the open air by labyrinth structure section 32 provided between ventilation fan 18 and the first bracket 5. Generation of heat of stator coil 17 radiates heat in the open air via the cooling wind which flows through the peripheral face and cooling ventilation flue 2a of stator iron core 1.

Generation of heat of rotor bar 14 radiates heat to the cooling wind which flows through ventilation flue 5a from ventilation fan 18. This composition can form a totally enclosed motor. The totally enclosed motor improved in this way does not introduce open air to the inside of the apparatus, so a filter and cleaning inside the plane can become unnecessary, and reduce maintenance.

The insulation performance of the stator coil is kept forever good because inside of apparatus does not become dirty.

PG sensor 21 and gear plate 22, which detect the revolving speed of an electric motor, are set in ventilation flue 5a formed between ventilation fan 18 and bearing bracket 7. Therefore, as compared with the case where these rotation detection circuits are provided outside the plane, and are covered, the direction size increase of an axis of an electric motor can be controlled.

Therefore, even when a rotation detection circuit is provided, it is not necessary to make the axis in the direction of the stator iron core and the rotor iron core smaller, and the loss of power of the electric motor is avoided.

Because PG sensor 21 and gear plate 22 are set along in the diameter direction of rotor shaft 11, even when rotor 16 carries out thermal expansion in the direction of the axis with the heat at the time of operation, PG sensor and gear plate 22 only shift in the direction of an axis slightly and they can maintain the space between these to a predetermined value.

Thereby, it is stabilized by PG sensor 21 and speed detection can be performed.

PG sensor 21 is the outside of gear plate 22, and is set in ventilation flue 5a above a perpendicular direction rather than discharge mouth 20.

Damage to the rotation detection circuit from a foreign substance being caught between PG sensor 21 and gear plate 22 can be reduced sharply by this, and a totally enclosed motor with a rotation detection circuit can be provided. If an electric motor rotates, ventilation fan 18 will rotate, the open air will be taken in from inspiratory port 19, and it will flow through ventilation flue 5a and cooling ventilation flue 2a from discharge mouth 20. Under the present circumstances, dust, sand dust (about 0.5 or larger dust), etc., may be taken into ventilation flue 5a with the open air.

As shown in FIG. 2, discharge of the dust from inspiratory port 19 is carried out, and it flows near the rotor shaft 11 once with mouth 20. At this time, small dust (dust below about 0.5 mm) S1 is greatly reversed at the rotor shaft 11 position because of a suction operation of impeller blade 18b. Small dust is breathed out outside from cooling ventilation flue 2a through ventilation flue 5a of the first bracket 5 with a cooling air.

At the moment large sand dust S2 hits rotor shaft 11, the speed of large sand dust S2 falls. With the reduced speed and the weight of large sand dust S2, large sand dust S2 falls in the direction of below rotor shaft 11. That is, large sand dust which is bit into the space portion of PG sensor 21 and gear plate 22 is blown outside through cooling ventilation flue 2a below rotor shaft 11. Therefore, by setting PG sensor 21 above the perpendicular direction rather than the center of rotor shaft 11, sand dust, etc., cannot reach between PG sensor 21 and gear plate 22, and it can prevent biting.

The totally enclosed motor in which the revolving speed detection is stabilized without producing a fall in output is possible to be obtained from the embodiment described above.

Next, the electric motor related to other embodiments is explained. In the embodiments described below, the same reference numeral is given to the same parts as the first embodiment mentioned above, and the redundant detailed explanation is omitted.

Figure 3:
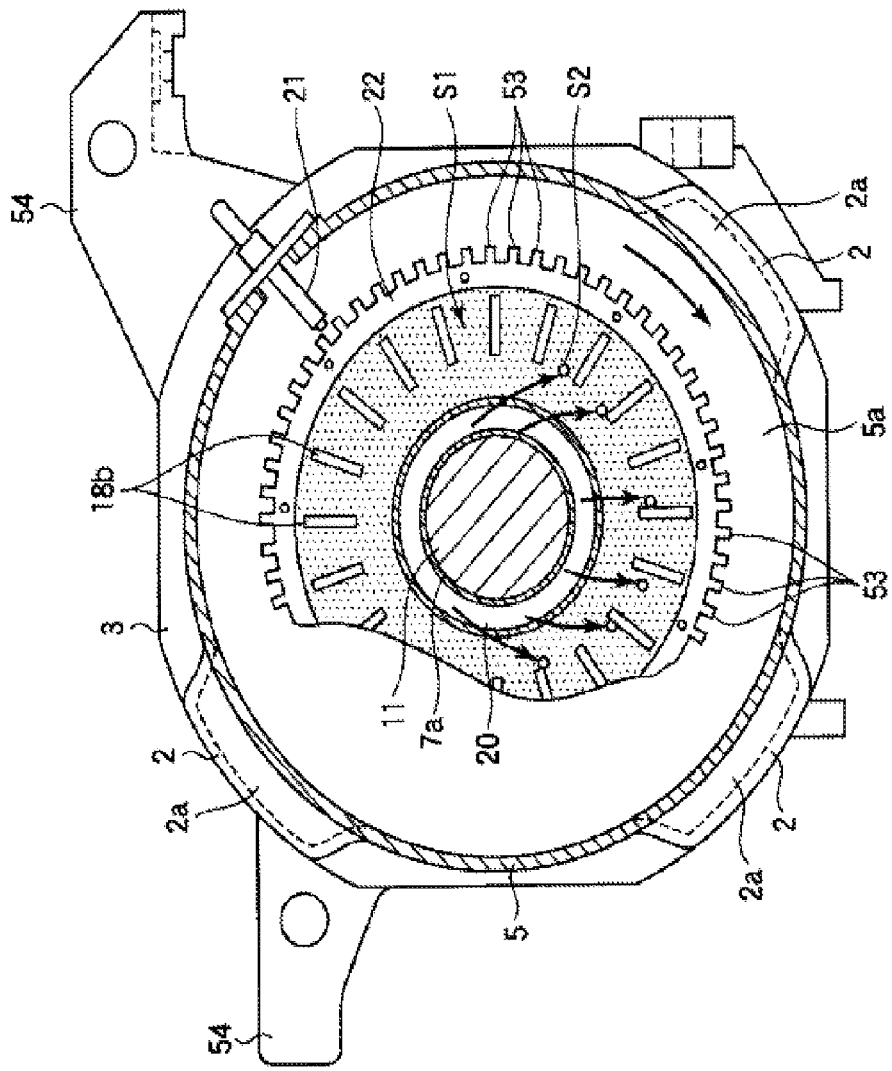
FIG. 3 is a transverse cross section of the electric motor related to a Second Embodiment.

FIG. 3 is a sectional view showing the rotation detection circuit portion of the totally enclosed motor related to a Second Embodiment. In the Second Embodiment, the arranged position of PG sensor, which composes a rotation detection circuit, is different from the first embodiment.

PG sensor 21 is set in the peripheral part of the first bracket 5 that is not the perpendicular direction of rotor shaft 11. However, PG sensor 21 is set at a place above discharge mouth 20 in the direction perpendicular to discharge mouth 20. One upper cooling ventilation flue is closed among the four cooling ventilation flues 2a provided in the perimeter of stator iron core 1, and PG sensor 21 is set in the position of the closed upper cooling ventilation flue. It is fixed to the first bracket 5 and PG sensor 21 is extended into ventilation flue 5a. PG sensor 21 is located along the diameter direction of gear plate 22 and rotor shaft 11.

Various positions and number of cooling ventilation flues 2a and PG sensors 21 can be changed. Also in the Second Embodiment composed as mentioned above, the same operation effect as the First Embodiment mentioned above can be obtained.

Figure 4:
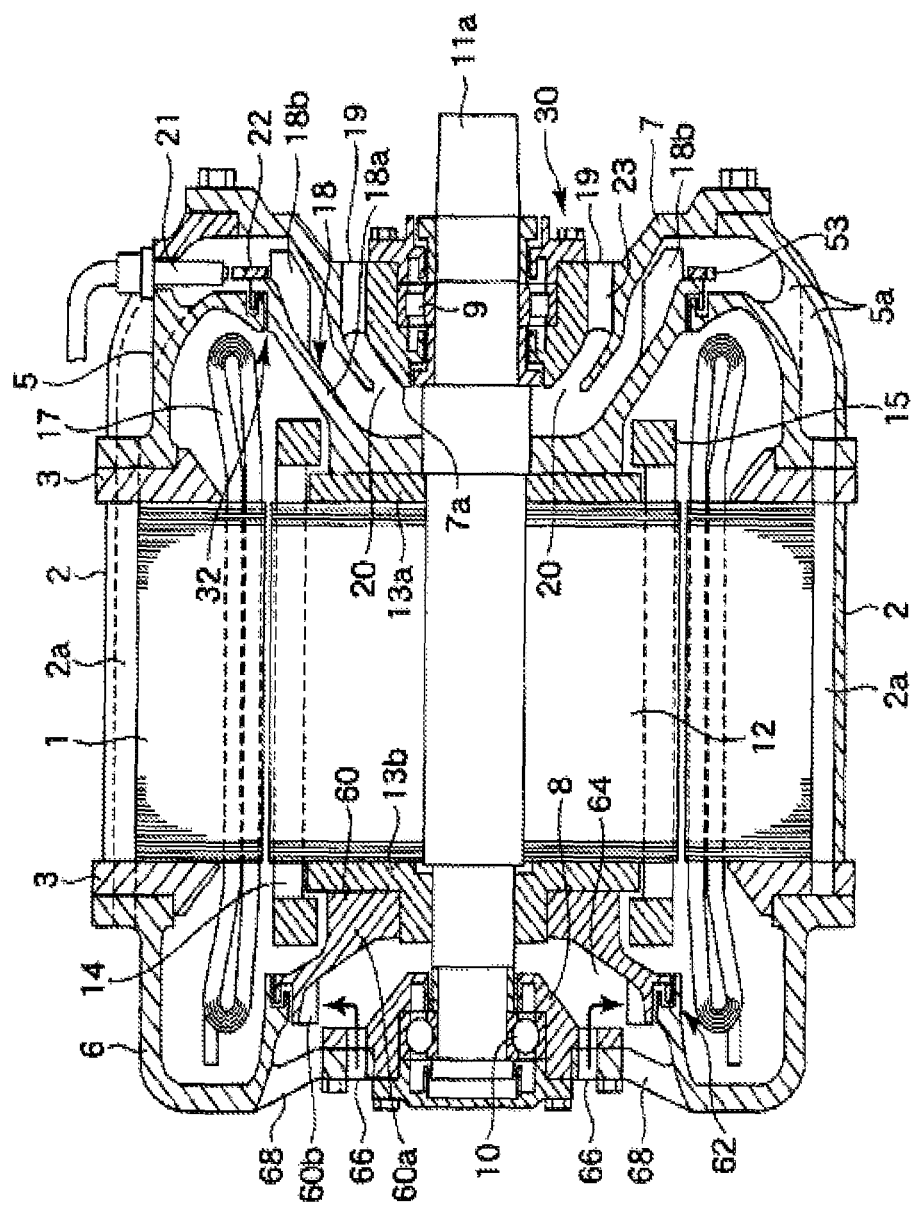
FIG. 4 is a longitudinal section showing the electric motor related to a Third Embodiment.

FIG. 4 shows the vertical section of the totally enclosed motor related to a Third Embodiment. In the Third Embodiment, the electric motor includes fan 60 at the anti-drive side of rotor shaft 11.

Fan 60 is attached to core holder 13b in the same axle between bearing 10 at the anti-drive end side, and rotor iron core 12, and can rotate freely to rotor shaft 11. Fan 60 has main plate 60a mostly formed in funnel shape, and a plurality of impeller blades 60b are provided in the peripheral part of the external surface of the main plate. The plurality of impeller blades 60b provided in the peripheral part of the external surface of the main plate at a predetermined interval while they are prolonged radiately, respectively.

Main plate 60a touches rotor iron core 12 in many respects via core holder 13b. A minute gap is kept where the outer periphery part of main plate 60a and the inner periphery of the projecting part by the side of the inside of apparatus of second bracket 6 are circular meet and are mutually engaged. This circular minute interval part is mutually formed in the abbreviated two-step structure of concavo-convex shape, and forms labyrinth structure section 62. By this labyrinth structure section 62, the inside of the electric motor and the open air are intercepted, and totally-enclosed of the electric motor are attained.

Ventilation flue 64 is formed between the external surface of main plate 60a and the inside of bearing housing 8, and further, a plurality of air intake holes 66 are formed in the outside of bearing 10 of bearing housing 8, and it is open for free passage to ventilation flue 64. A plurality of discharge mouths 68 are formed in the perimeter of bearing housing 8 with second bracket 6, and it is open for free passage to ventilation flue 64.

Fan 60 rotates to rotor shaft 11 and, after inhaling the open air from air intake hole 66 and passing along ventilation flue 64 by fan's 60 impeller blade 60b, it breathes out the outside of the plane from discharge mouth 68. Heat generated by rotor bar 14 is transmitted via rotor iron core 12 and core holder 13b, and a cooling air is made to radiate heat from the external surface of main plate 60a. PG sensor 21 and gear plate 22 which compose a rotation detection circuit are set in ventilation flue 5a on the drive end side, as in the first embodiment.

According to the above-mentioned Third Embodiment, a totally enclosed motor whose cooling capability is improved has been obtained. The same operation effect as the First Embodiment mentioned above can be obtained.

A rotation detection circuit may be provided not only in the drive side of rotor shaft 11 but in the anti-drive side. In this case, a gear plate is attached to fan 60 and located in the ventilation flue on the side of an anti-drive side. PG sensor is attached to second bracket 6 or bearing housing 8, and is located in a ventilation flue.

Figure 5:
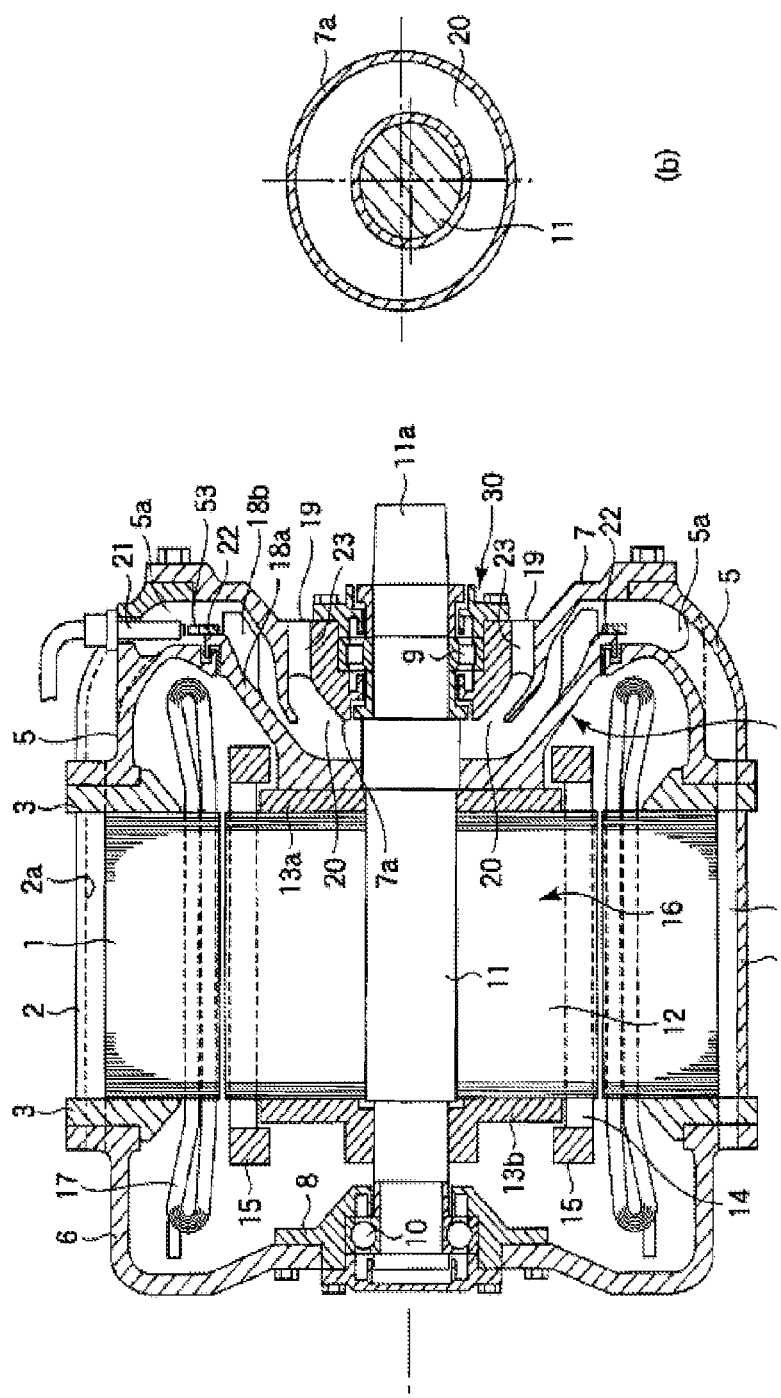
FIG. 5 is a front view showing the longitudinal section and discharge mouth in which the electric motor related to the Fourth Embodiment is shown.

FIG. 5 shows the vertical section of a totally enclosed motor and the front view of a discharge mouth related to the Fourth Embodiment. In the Fourth Embodiment, the composition of discharge mouth 20, which sends out the taken-in cooling air to ventilation flue 5a, is different from the First Embodiment.

As shown in FIG. 5, it has an almost cylindrical projection section 7a, which bearing bracket 7 is set in the circumference of bearing 9 in the central part, and is projected to the inner side of the apparatus, and circular discharge mouth 20 is formed in the projection end. To the center of rotor shaft 11, eccentricity of the discharge mouth 20 is carried out above the perpendicular direction, and it is formed in it. That is, the gap between the upper part of projection section 7a and the ventilation fan's 18 main plate 18a is small than the gap between the lower part of projection section 7a and the main plate 18a. Thereby, as for the upper part in the perpendicular direction, i.e., the portion located at the side of the PG sensor 21, width is narrow rather than the lower ventilation flue among ventilation flues 5a.

Even when large dust, such as sand dust, is taken in from inspiratory port 19 with a cooling air by having such composition, it becomes difficult to flow through such dust into ventilation flue 5a of the upper part with narrow width, and it becomes possible about reaching to PG sensor 21 to prevent more certainly.

Figure 6:
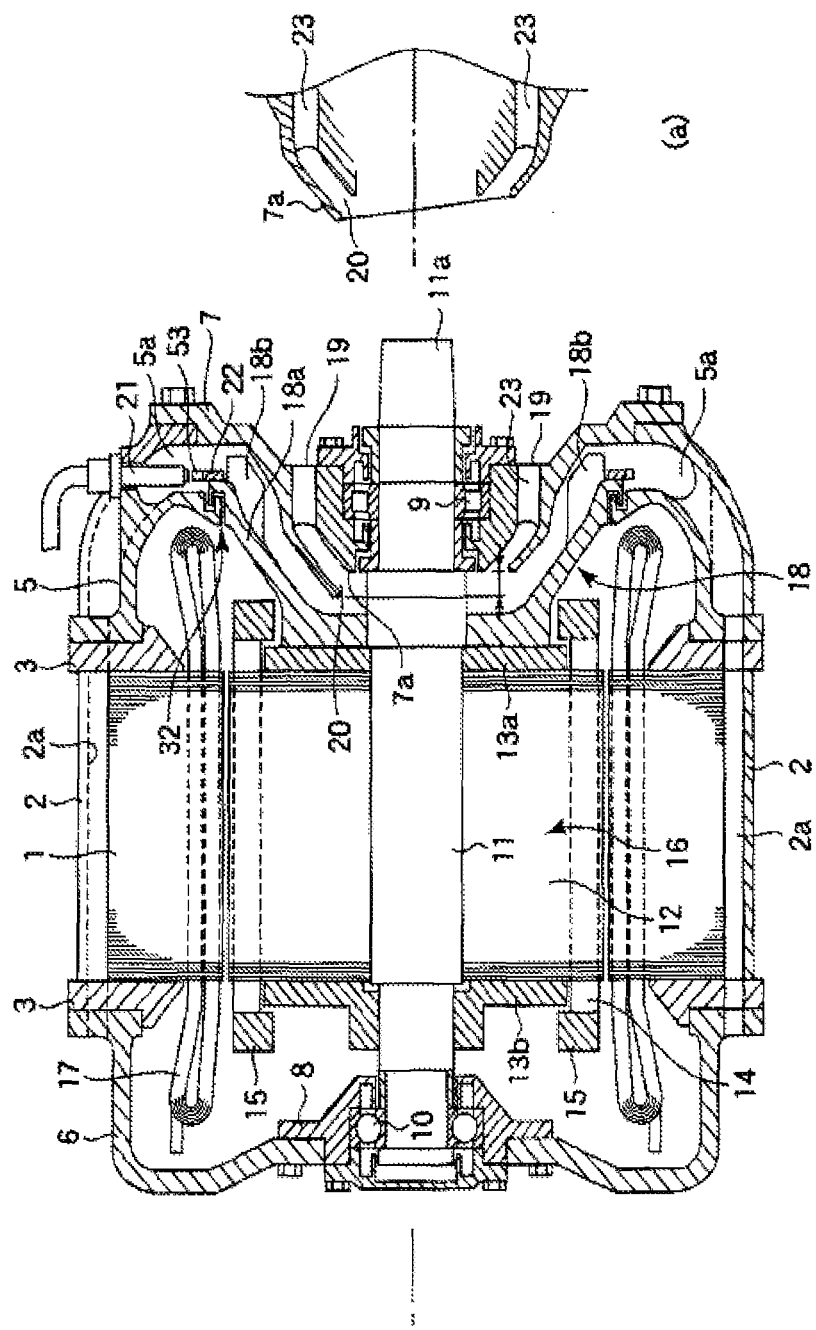
FIG. 6 is a sectional view showing the longitudinal section and discharge mouth in which the electric motor related to a Fifth Embodiment is shown.

FIG. 6 is a sectional view expanding and showing the vertical section and the discharge mouth of a totally enclosed motor related to a fifth embodiment. According to a fifth embodiment, the composition of discharge mouth 20 which sends out the taken-in cooling air to ventilation flue 5a is different from first embodiment.

As shown in FIG. 6, it has almost cylindrical projection section 7a, which bearing bracket 7 is set in the circumference of bearing 9 in the central part, and is projected to the inner side of the apparatus, and circular discharge mouth 20 is formed in the projection end. Discharge mouth 20 is formed in the center and the same axle of rotor shaft 11. The amount the upper section in the perpendicular direction of projection section 7a has extended closer to the side of ventilation fan's 18 main plate 18a rather than the bottom portion.

Thereby, the upper part portion of discharge mouth 20 approaches closer to rotor shaft 11 rather than the bottom portion, and has turned to the center, i.e., PG sensor 21 and the contrary, side of a rotor shaft more. According to this embodiment, all the circumferences are formed continuously and discharge mouth 20 inclines aslant to rotor shaft 11.

Even when large dust, such as sand dust, is taken in from inspiratory port 19 with a cooling air by having such composition, such dust can be breathed out downward [of the perpendicular direction] from discharge mouth 20.

Therefore, it becomes difficult to flow through dust into upper ventilation flue 5a, and it becomes possible to prevent dust from reaching PG sensor 21 with more certainty.

Figure 7:
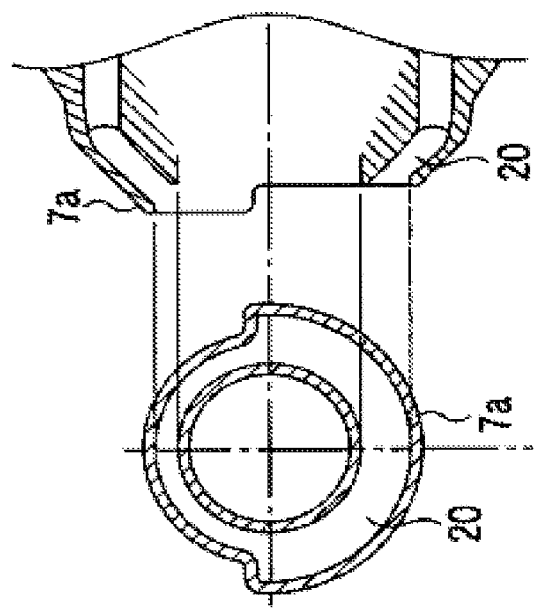
FIG. 7 is the front view and sectional view showing the discharge mouth portion of the electric motor related to the modification in a Fifth Embodiment.

In the above-mentioned composition, although all the circumferences are formed continuously, discharge mouth 20 may extend only the perpendicular direction upper part half of projection section 7a to ventilation fan's 18 main plate 18a side rather than a bottom portion, as shown in FIG. 7.

Thereby, the upper part half of discharge mouth 20 approaches rotor shaft 11 rather more than the bottom half, and has turned to the center, i.e., PG sensor 21 and the contrary, side of a rotor shaft more. Like the above also as such composition, it becomes difficult for dust to flow through into upper ventilation flue 5a, and it becomes possible to prevent dust from reaching PG sensor 21 with more certainty.

Figure 8:
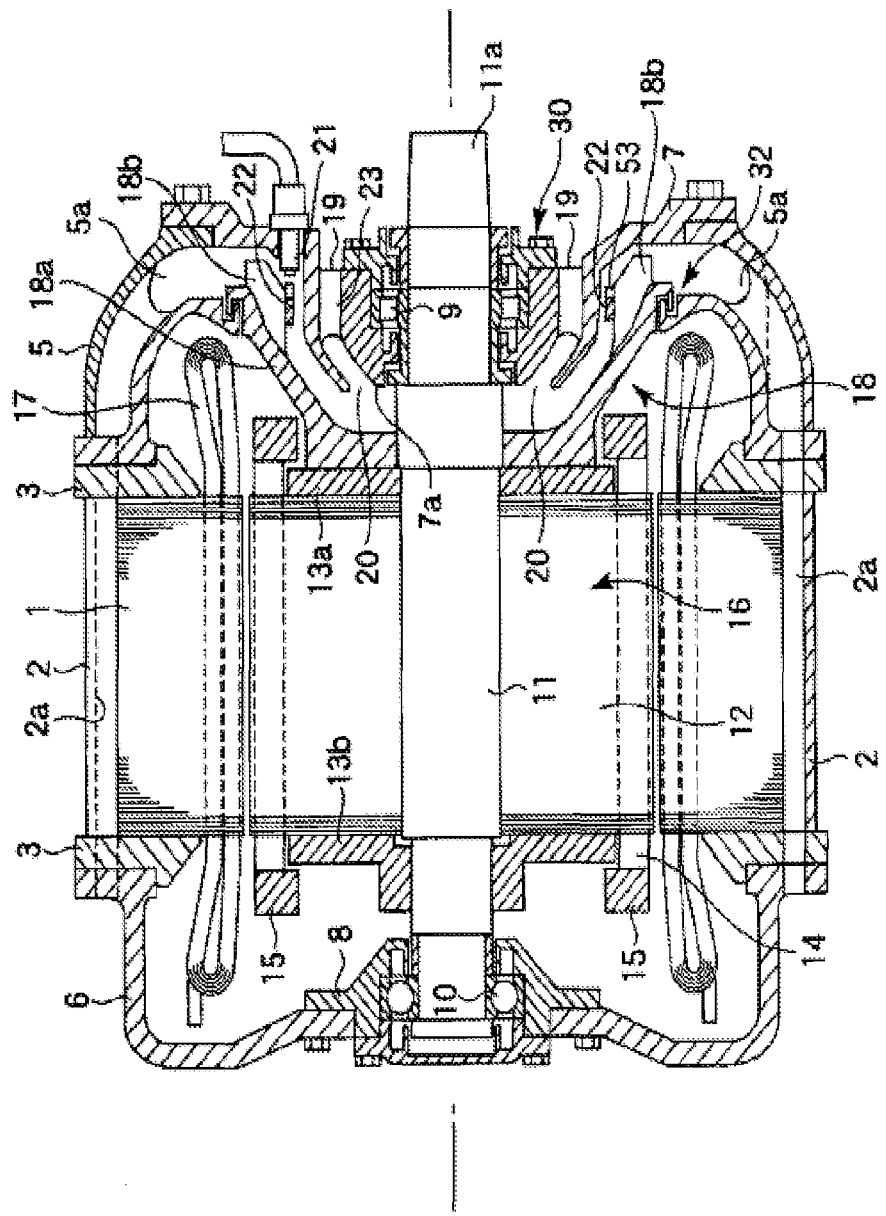
FIG. 8 is a longitudinal section showing the electric motor related to a Sixth Embodiment.

FIG. 8 shows the vertical section of the totally enclosed motor related to a Sixth Embodiment. According to a Sixth Embodiment, the attachment position of gear plate 22 and PG sensor is different from the First Embodiment. As shown in FIG. 8, gear plate 22 is formed cylindrical and is fixed to ventilation fan's 18 impeller blade 18b. Gear plate 22 is located in the same axle with rotor shaft 11, and is located in ventilation flue 5a. The end by the side of bearing bracket 7 of gear plate 22 is formed in unevenness over all the circumferences, and is composed of a plurality of teeth 53.

PG sensor 21 is attached to bearing bracket 7, and is extended into ventilation flue 5a along a direction almost parallel to rotor shaft 11.

The detection end of PG sensor 21 is placed a predetermined space, for example, about 1 mm and is counter tooth 53 of gear plate 22. PG sensor 21 is placed on an upper position above rotor shaft 11 and discharge mouth 20. Thus, PG sensor 21 may be set not only in the peripheral part of the first bracket 5 but in other positions.

Also in the Sixth Embodiment composed as mentioned above, like the First Embodiment mentioned above, damage to the rotation detection circuit by a foreign substance caught between PG sensor 21 and gear plate 22 can be reduced sharply, and a totally enclosed motor with a rotation detection circuit can be provided further.

And also in the Second through Sixth Embodiments mentioned above, the totally enclosed motor in which the revolving speed detection is stabilized without producing a fall in the output is possible to be obtained.

This disclosure is not limited to the above-mentioned embodiment as it is, in an operation stage, in the range which does not deviate from that gist, can change a component and can be materialized. Various inventions can be formed with combination with proper components of plurality currently indicated by the above-mentioned embodiment. For example, some components may be deleted from all the components shown in an embodiment. The component covering a different embodiment may be combined suitably.

While certain embodiments have been described, these embodiments have been presented by way of example only, and are not intended to limit the scope of the disclosures. Indeed, the novel methods and apparatuses described herein may be embodied in a variety of other forms; furthermore, various omissions, substitutions and changes in the form of the embodiments described herein may be made without departing from the spirit of the disclosures. The accompanying claims and their equivalents are intended to cover such forms or modifications as would fall within the scope and spirit of the disclosures.

What is claimed is:
1. An electric motor comprising:
a stator core;
a first bracket fixed to a first side of the stator core in an axial direction;
a first bearing housing fixed to the first bracket, wherein the first bearing housing holds a bearing;
a second bracket fixed to a second side of the stator core in the axial direction;
a second bearing housing fixed to the second bracket, wherein the second bearing housing holds a bearing;
a rotor comprising:
  a rotor shaft rotatably supported by the bearings; and
  a rotor core attached to the rotor shaft, wherein the rotor core faces an inner side of the stator core;
a ventilation fan attached to the rotor shaft between the rotor core and the first bearing housing;
a ventilation flue formed between the first bearing housing and the first bracket, wherein the ventilation flue is configured to draw open air from one or more inspiratory ports to a peripheral part of the first bracket; and a rotation detection circuit comprising:
  a detected part fixed to the ventilation fan within the ventilation flue; and
  a sensor operable to detect the detected part, wherein the sensor is set in the ventilation flue and is positioned counter to the detected part, and wherein the entire sensor is positioned above all of the inspiratory ports of the electric motor when the rotor shaft is oriented parallel to ground.

2. The electric motor of claim 1, wherein a labyrinth structure is formed by a peripheral part of the ventilation fan engaged by an inner portion of the first bracket with a gap between.

3. The electric motor of claim 2, wherein the sensor is positioned centered above an axis of the rotor shaft.

4. The electric motor of claim 3, wherein the sensor is fixed to a peripheral part of the first bracket and extends into the ventilation flue.

5. The electric motor of claim 2, wherein the sensor is positioned above an axis of the rotor shaft and is offset horizontally from the axis of the rotor shaft.

6. The electric motor of claim 2, wherein:
  the detected part comprises a gear plate fixed to the ventilation fan; and
  the gear plate has a plurality of teeth set along the circumference of the plate at a predetermined interval.

7. The electric motor of claim 6, wherein the gear plate is located outside of the labyrinth structure, and the gear plate and the sensor are arranged in a direction following the circumference of the rotor shaft.

8. The electric motor of claim 2, wherein:
  the ventilation fan comprises a plurality of impeller blades;
  the detected part comprises a gear plate fixed to the impeller blades; and
  the gear plate has a plurality of teeth set along the circumference of the plate at a predetermined interval.

9. The electric motor of claim 1 comprising:
  a cylindrical projection formed in the first bearing housing; and
  a discharge mouth formed in the cylindrical projection, wherein the discharge mouth is eccentric.

10. The electric motor of claim 1 comprising a cylindrical projection formed in the first bearing housing, wherein an upper portion of the cylindrical projection extends further to the ventilation fan than a bottom portion of the cylindrical projection.

11. An electric motor comprising:
  a stator core;
  a first bracket fixed to a first side of the stator core in an axial direction;
  a first bearing housing fixed to the first bracket, wherein the first bearing housing holds a bearing;
  a second bracket fixed to a second side of the stator core in the axial direction;
  a second bearing housing fixed to the second bracket, wherein the second bearing housing holds a bearing;
  a rotor comprising:
    a rotor shaft rotatably supported by the bearings; and
    a rotor core attached to the rotor shaft, wherein the rotor core faces an inner side of the stator core;
  a first ventilation fan attached to the rotor shaft between the rotor core and the first bearing housing;
  a first ventilation flue formed between the first bearing housing and the first bracket, wherein the first ventilation flue is configured to draw open air from one or more inspiratory ports to a peripheral part of the first bracket;
  a second ventilation fan attached to the rotor shaft between the rotor core and the second bearing housing; and
  a second ventilation flue formed between the second bearing housing and the second bracket, wherein the second ventilation flue is configured to draw open air from one or more inspiratory ports to a peripheral part of the second bracket; and
  a rotation detection circuit comprising:
    a detected part fixed to the first ventilation fan within the first ventilation flue; and
    a sensor operable to detect the detected part, wherein the sensor is set in the first ventilation flue and is positioned counter to the detected part, and wherein the entire sensor is positioned above all of the inspiratory ports of the electric motor when the rotor shaft is oriented parallel to ground.

12. The electric motor of claim 11, wherein:
  a first labyrinth structure is formed by a peripheral part of the first ventilation fan engaged by an inner portion of the first bracket with a gap between; and
  a second labyrinth structure is formed by a peripheral part of the second ventilation fan engaged by an inner portion of the second bracket with a gap between.

13. The electric motor of claim 12, wherein the sensor is positioned centered above an axis of the rotor shaft.

14. The electric motor of claim 13, wherein the sensor is fixed to a peripheral part of the first bracket and extends into the first ventilation flue.

15. The electric motor of claim 12, wherein the sensor is positioned above an axis of the rotor shaft and is offset horizontally from the axis of the rotor shaft.

16. An electric motor comprising:
  a stator core;
  a first bracket fixed to a first side of the stator core in an axial direction;
  a first bearing housing fixed to the first bracket, wherein the first bearing housing holds a bearing;
  a second bracket fixed to a second side of the stator core in the axial direction;
  a second bearing housing fixed to the second bracket, wherein the second bearing housing holds a bearing;
  a rotor comprising:
    a rotor shaft rotatably supported by the bearings; and
    a rotor core attached to the rotor shaft, wherein the rotor core faces an inner side of the stator core;
  a first ventilation fan attached to the rotor shaft between the rotor core and the first bearing housing;
  a first ventilation flue formed between the first bearing housing and the first bracket, wherein the first ventilation flue is configured to draw open air from one or more inspiratory ports to a peripheral part of the first bracket;
  a second ventilation fan attached to the rotor shaft between the rotor core and the second bearing housing; and
  a second ventilation flue formed between the second bearing housing and the second bracket, wherein the second ventilation flue is configured to draw open air from one or more inspiratory ports to a peripheral part of the second bracket; and
  a rotation detection circuit comprising:
    a detected part fixed to the second ventilation fan within the second ventilation flue; and
    a sensor operable to detect the detected part, wherein the sensor is set in the second ventilation flue and is positioned counter to the detected part, and wherein the entire sensor is positioned above all of the inspiratory ports of the electric motor when the rotor shaft is oriented parallel to ground.

17. The electric motor of claim 16, wherein:
a first labyrinth structure is formed by a peripheral part of the first ventilation fan engaged by an inner portion of the first bracket with a gap between; and
a second labyrinth structure is formed by a peripheral part of the second ventilation fan engaged by an inner portion of the second bracket with a gap between.

18. The electric motor of claim 17, wherein the sensor is positioned centered above an axis of the rotor shaft.

19. The electric motor of claim 18, wherein the sensor is fixed to a peripheral part of the second bracket and extends into the second ventilation flue.

20. The electric motor of claim 17, wherein the sensor is positioned above an axis of the rotor shaft and is offset horizontally from the axis of the rotor shaft.

* * * * *